United States Patent
Fornos et al.

(10) Patent No.: US 11,897,204 B2
(45) Date of Patent: Feb. 13, 2024

(54) ANCILLARY OBJECTS IN OBJECT GENERATION

(71) Applicant: HEWLETT-PACKARD DEVELOPMENT COMPANY, L.P., Spring, TX (US)

(72) Inventors: Pol Fornos, Sant Cugat del Valles (ES); David Ramirez Muela, Sant Cugat del Valles (ES); Sergio Puigardeu Aramendia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 329 days.

(21) Appl. No.: 16/759,921

(22) PCT Filed: Dec. 6, 2017

(86) PCT No.: PCT/US2017/064956
§ 371 (c)(1),
(2) Date: Apr. 28, 2020

(87) PCT Pub. No.: WO2019/112580
PCT Pub. Date: Jun. 13, 2019

(65) Prior Publication Data
US 2020/0324489 A1    Oct. 15, 2020

(51) Int. Cl.
*B29C 67/00* (2017.01)
*B29C 64/40* (2017.01)
(Continued)

(52) U.S. Cl.
CPC ............ *B29C 64/40* (2017.08); *B29C 64/153* (2017.08); *B29C 64/393* (2017.08); *B33Y 10/00* (2014.12);
(Continued)

(58) Field of Classification Search
CPC ..... B29C 64/40; B29C 64/153; B29C 64/393; B33Y 10/00; B33Y 30/00; B33Y 40/20; B33Y 50/00; B33Y 50/02
See application file for complete search history.

(56) References Cited

U.S. PATENT DOCUMENTS 8,287,794 B2    10/2012   Pax et al.
2004/0254665 A1   12/2004   Fink et al.
(Continued)

FOREIGN PATENT DOCUMENTS

RU    2595072 C2    8/2015
RU    2016116901 A3    5/2018
(Continued)

OTHER PUBLICATIONS

Pax et al., "3D-printed 'bionic skin' to give robots sense of touch," May 11, 2017, 6 p. http://www.deccanchronicle.com/technology/in-other-news/110517/3d-printed-bionic-skin-to-give-robots-sense-of-touch.html.

(Continued)

*Primary Examiner* — Ryan M Ochylski
(74) *Attorney, Agent, or Firm* — Michael Dryja

(57) ABSTRACT

In an example, a method includes in an additive manufacturing process, generating a first object and generating an ancillary object on top of the first object to reduce a thermal gradient of the first object during cooling.

12 Claims, 3 Drawing Sheets

(51) Int. Cl.
  *B33Y 10/00*   (2015.01)
  *B33Y 50/02*   (2015.01)
  *B29C 64/153*  (2017.01)
  *B29C 64/393*  (2017.01)
  *B33Y 40/20*   (2020.01)
  *B33Y 40/00*   (2020.01)

(52) U.S. Cl.
  CPC ............... *B33Y 40/00* (2014.12); *B33Y 40/20* (2020.01); *B33Y 50/02* (2014.12)

(56) References Cited

U.S. PATENT DOCUMENTS

2017/0173874 A1   6/2017   Batchelder et al.
2018/0111334 A1*  4/2018   Gold ..................... B22F 10/40

FOREIGN PATENT DOCUMENTS

WO   WO-2015106840 A1   7/2015
WO   WO-2016030405 A1   3/2016

OTHER PUBLICATIONS

HPDC, "International Search Report and Written Opinion," dated Sep. 6, 2018, PCT Patent App. No. PCT/US2017/064956, 7 p.

* cited by examiner

ANCILLARY OBJECTS IN OBJECT GENERATION

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
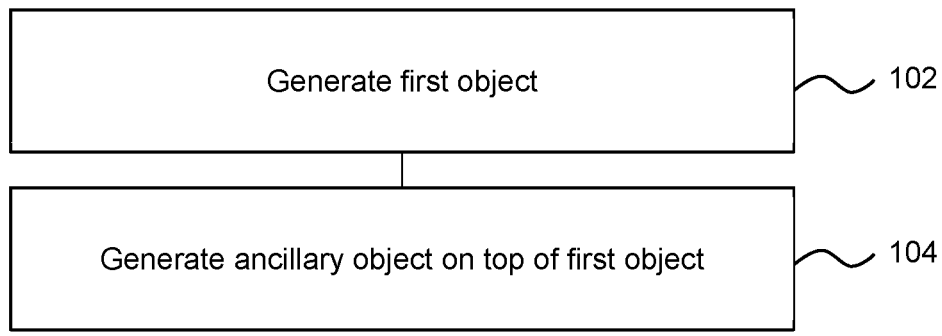
FIG. 1 is an example method of additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that when energy (for example, heat) is applied to the layer, the build material heats up/melts, coalesces and solidifies to form a slice of the three-dimensional object in accordance with the pattern. In other examples, coalescence may be achieved in some other manner.

In addition to a fusing agent, in some examples, a print agent may comprise a detailing agent, or coalescence modifier agent, which acts to modify the effects of a fusing agent for example by reducing (e.g. by cooling) or increasing coalescence or to assist in producing a particular finish or appearance to an object. A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices defined between parallel planes of the model. Each slice may define a portion of a respective layer of build material that is to be solidified or caused to coalesce by the additive manufacturing system.

In some examples, it may be intended to generate a number of objects in a single, common, build process. This may for example increase the throughput of an additive manufacturing apparatus and increase energy efficiency.

Following object generation, a fabrication chamber and any object(s) there in may be at an elevated temperature. In general, regions of the fabrication chamber which contain a higher proportion of solidified build material absorb more energy and therefore may be hotter than regions of the fabrication chamber which contain a lower proportion of solidified build material. When cooling the object(s) (which may be carried out under ambient conditions in some examples, or even at an elevated temperature to slow the rate of cooling), where there is variability in the temperature over an object, this can lead to issues such as curling or warping which may disrupt the geometrical accuracy and/or mechanical properties of an object, and can result in stresses within the apparatus itself. To that end, following object generation, a number of powder layers may be formed, on which no print agents are printed, overlying the object to act as a thermal blanket, reducing the thermal gradient between the object and the atmosphere above the fabrication chamber.

FIG. 1 is an example of a method of additive manufacturing, which may be a layer by layer object generation process, otherwise known as 3D printing. In block 102, a first object is generated. This may be an intended or primary object, i.e. the object which is intended to be produced in the object generation operation. In some examples, the first object may be generated based on object model data representing at least a portion of an object to be generated by an additive manufacturing apparatus by fusing build material. The object model data may for example comprise a Computer Aided Design (CAD) model, and/or may for example be a STereoLithographic (STL) data file. In some examples, the first object may be one of a plurality of objects being generated in a single object generation process, i.e. within a single fabrication chamber.

Block 104 comprises generating an ancillary object on top of the first object. The ancillary object is intended to reduce a thermal gradient (e.g. the vertical thermal gradient) of the first object during cooling.

In some examples, the first object may be described in an initial print job, and the ancillary object may be specified in data that is generated after receipt and analysis of the initial print job data, and/or in some examples may be specified during the generation of the first object. The ancillary object may be a sacrificial object, specified according to its intended function, and may have no purpose following cooling.

The effect of generating the ancillary object may have comparable effect to providing a relatively thick 'thermal blanket' of untreated build material to reduce a thermal gradient of generated object during cooling.

For example, when objects may be deliberately 'buried' under multiple layers of untreated build material on which no print agent is printed to reduce thermal gradients during cooling, there may be around a hundred such layers. Moreover, as mentioned above, in some examples, in order to reduce the thermal gradient, the layers of untreated build material may be heated, for example using heat lamps during the cooling process to reduce the thermal gradient. However, by generating an ancillary object, the number of 'thermal blanket' layers of build material to effectively manage the thermal gradient may be reduced. For example, according to the methods set out herein, there may be a few (around 10 to 15) layers of untreated build material formed on top of the first object to ensure that the ancillary object does not fuse/adhere thereto, followed by generation of the ancillary object which may be a few layers (around three to 10 layers) thick, wherein each layer be around from 70 to 120 microns thick in some examples. The function of a 'thermal blanket' that may have comprised around a hundred layers of untreated build material may be achieved in around 13 to 25 layers of build material comprising an ancillary object. This allows additional space within the fabrication chamber for fabrication of intended objects as the number of layers which are reserved to produce a thermal blanket may be reduced. The reduction in the number of layers used in respect of the thermal gradient may also reduce the time of object generation procedures and/or reduce the amount of build material used in generating objects. In some examples, the use of heat lamps to control the rate of cooling may be reduced or eliminated.

Figure 2:
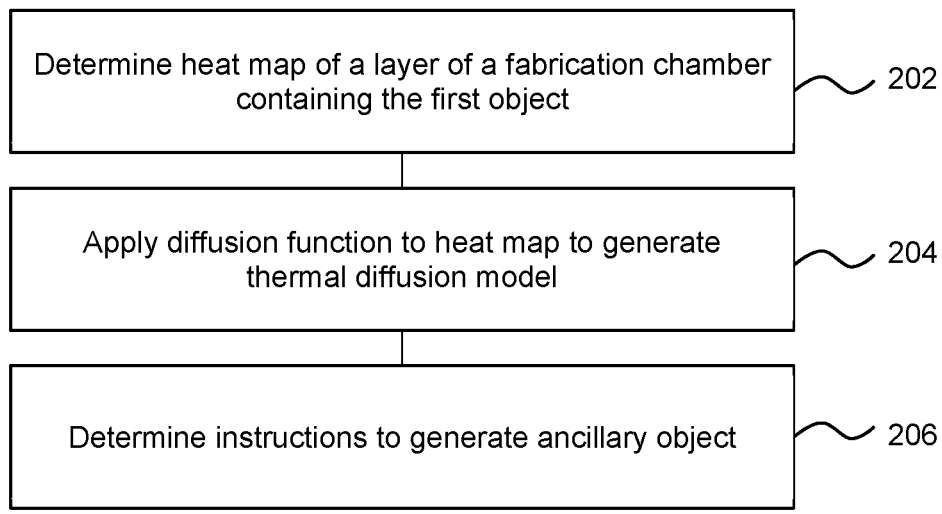
FIG. 2 is an example of a method of determining instructions for generating an ancillary object.

FIG. 2 shows an example of a method for determining instructions for generating the ancillary object. In some examples, the method may be implemented by at least one processor.

Block 202 comprises determining a heat map of a layer of a fabrication chamber containing the first object. In some examples, this may be a heat map of the layer of build material containing the uppermost layer of the first object. In other examples, this may be a heat map of a subsequent layer of build material, or a layer in the upper region of the first object. The heat map may, for example, be determined by measurement, for example using a thermal camera to capture a heat map of the layer. In other examples, a heat map may be derived based on theory or thermal models of the first object (and any other object within the fabrication chamber) or the like.

Block 204 comprises applying a diffusion function to the heat map to generate the thermal diffusion model. For example, the diffusion function may model thermal diffusion which may occur following object generation. In other words, hot spots in a heat map of an upper layer may 'bloom' to cover a different area, and the ancillary object may be generated so as to cover this area. This may for example mean that small voids in the first object or between objects which may be apparent in the heat map are less apparent or non-existent in the thermal diffusion model. In general, the thermal footprint of an object portion may diffuse and reduce with distance from the object (for example diffusing beyond the boundary of the first object). Thus the thermal diffusion model may be considered as a thermal projection of the first object.

In generation of an object, there may be a thermal diffusion which heats the build material around the object. The temperatures reached in the vicinity of the object during object generation may be associated with the solid volume of the object: generally, larger object portions which are formed by applying a larger volume of fusing agent, or regions of a fabrication chamber which otherwise have a relatively high proportion of solidified material may become hotter (i.e. regions which have a relatively high 'thermal mass'), and thus heat a larger region of the surrounding build material, and/or heat adjacent regions to higher temperature, than smaller object portions and/or more sparsely solidified regions (lower thermal mass regions) of a fabrication chamber.

The heat may decrease with distance from the object, for example according to a predetermined diffusion function which may depend on the thermal properties of the build material, print agents, temperatures reached, and the like. The thermal mass and cooling dynamics of object regions may depend on any or any combination of the shape (geometry) and the boundary conditions (e.g. powder temperature, object packing density, and the like). Regions with high proportions of solidified material can become heat reservoirs that can release heat in larger quantities during phase change at crystallization.

Block 206 comprises determining instructions to generate the ancillary object. Determining the instructions comprises, in this example, determining instructions for the placement of fusing agent on at least one layer of build material. For example, the shape of the ancillary object may be based on the thermal diffusion model, and may approximately follow the shape of the first object, having had a thermal diffusion transformation applied thereto.

The temperature of the ancillary object during and following generation may vary in different regions thereof. In some examples, the placement of fusing agent may be intended to provide a thermal profile for the ancillary object which is similar to the thermal diffusion model. In other words, in general, in regions of the ancillary object where the temperature of the underlying fabrication chamber is higher, the ancillary object may be generated to reach a higher temperature than in other regions. The heat of the ancillary object during object generation may be controlled by determining instructions as to the level of print agent (i.e. fusing agent or cooling agent) which is applied in forming a region of the ancillary object. By applying additional fusing agent, the temperature will be increased compared to regions where less fusing agent is applied. In some examples, the object may be defined and/or generated to be thicker (i.e. formed of more layers) in some regions than in others, for example in those regions overlying hotter portions of the underlying fabrication chamber. In some examples, the placement of print agent (including fusing agent and/or cooling agent) outside the intended extent of the ancillary object may also be defined, for example to define in turn the thermal profile of an entire layer. For example, a relatively sparse distribution of fusing agent may result in an increased temperature of the layer, even if the underlying build material does not reach its fusing temperature. This may allow for greater control of the thermal profile of the layer as a whole.

The amount of fusing agent which is applied may be described in the print instructions by defining a 'contone' level of the fusing agent depending on the intended temperature of the ancillary object during or following object generation (which may be based on the actual or anticipated temperature of the underlying fabrication chamber) at a print addressable location. This may in turn be used to define a number of drops and/or a drop size for the fusing agent to be applied at a particular addressable location, for example using a printhead or the like.

By generating an ancillary object which has a similar thermal profile to the underlying fabrication chamber, the thermal gradients beneath the ancillary object may be controlled such that variation therein across the fabrication chamber is reduced or minimised. When compared to a situation where hotter regions of an object fabricated towards the top of a fabrication chamber will experience a greater thermal gradient than cooler regions, providing a more consistent thermal gradient may reduce the amount of warping, curling and the like of the object (instead, such warping, curling, etc. may be experienced by the ancillary object, which may be a sacrificial object and discarded following manufacture). In other words, the thermal properties of the ancillary object may be selected so as to provide a thermal gradient between the first object and the ancillary object (or more generally, and underlying fabrication chamber content) which is substantially constant (or is controlled to be within threshold values) for all parts of the first object.

Figure 3:
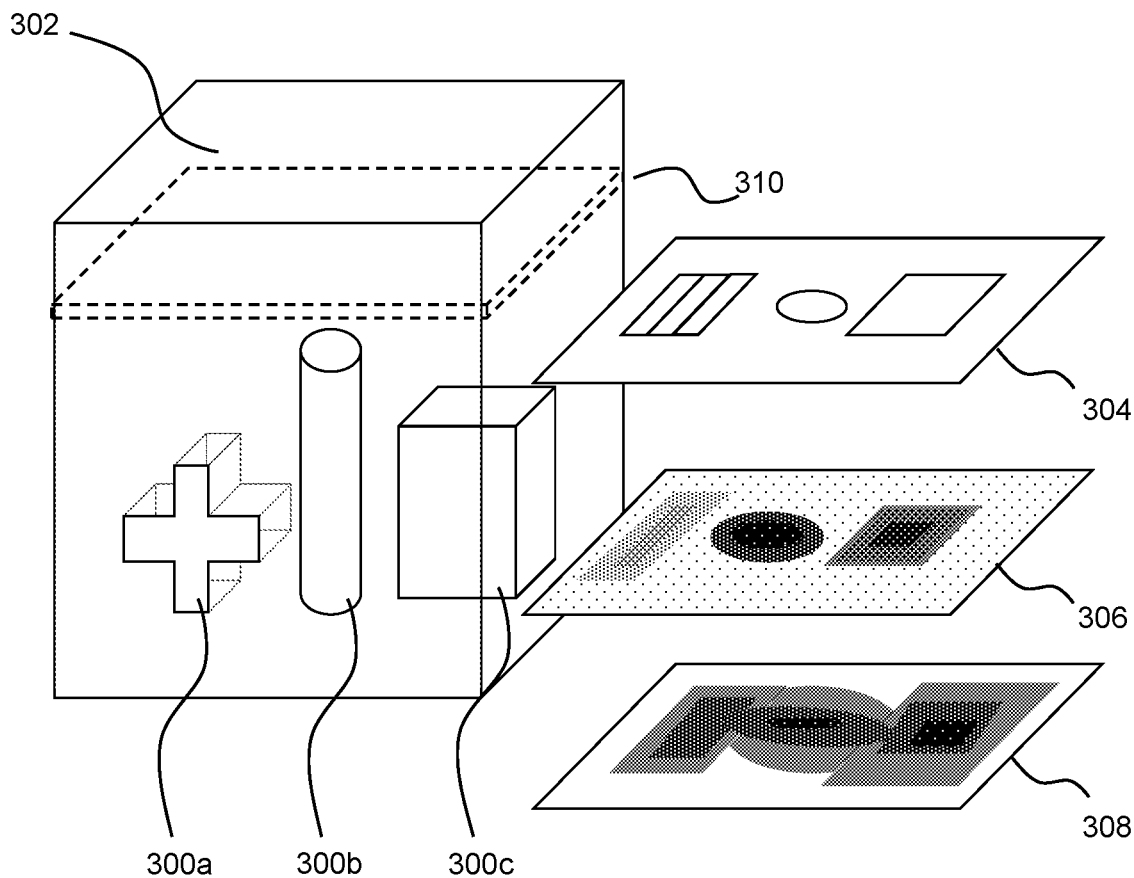
FIG. 3 is an example of a fabrication chamber containing objects and illustrates processes in an example of a method of defining an ancillary object.

FIG. 3 shows an example of a plurality of objects 300a-c arranged in fabrication chamber 302. The uppermost part of each object 300a-c is identified and projected into a common upper layer 304. In this example, a heat map 306 for this layer is generated based on thermal models of the objects. A diffusion function is applied to the heat map 306 to generate a contoned fusing agent distribution map 308 (where darker shading represents a higher contone level, and in turn a higher amount of fusing agent is to be applied in generating that object region, and white indicates that no fusing agent is to be applied) which may be used in generating the ancillary object as described above. In some examples, the same contoned fusing agent distribution map 308 may be used to generate each layer of the ancillary object, although in other examples, different layers may have different fusing agent distribution maps. In some examples, the ancillary object may be formed to as to have a thermal profile which varies over its surface by changing the number of layers in one object portion compared to another.

The ancillary object may be formed in at least one layer in a region 310 of the fabrication chamber 302. In some examples, a plurality of discrete ancillary objects may be specified and/or formed.

Figure 4:
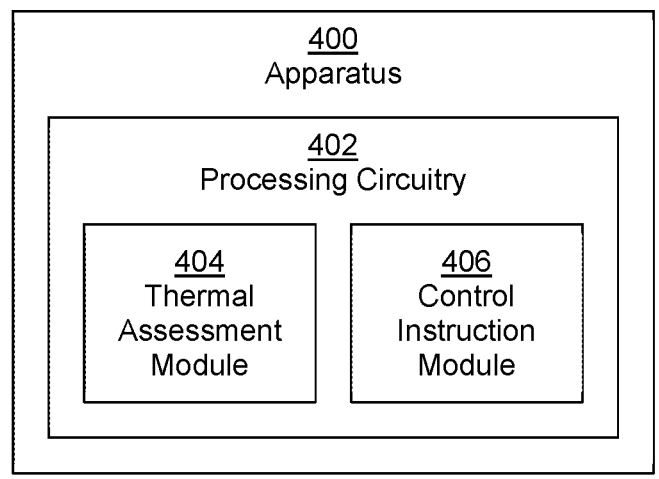
FIG. 4 is a an example of an apparatus comprising processing apparatus for processing data for additive manufacturing.

FIG. 4 is an example of an apparatus 400 comprising processing circuitry 402. The processing circuitry 402 comprises a thermal assessment module 404 and a control instruction module 406. The thermal assessment module 404 is, in use of the apparatus 400, to determine a vertical thermal projection of a layer by layer object generation operation. The vertical thermal projection may, in some examples be determined as set out above in relation to the thermal diffusion model, for example based on a theoretical or measured heat map to which a diffusion function may be applied.

The control instruction module 406 is, in use of the apparatus 400, to generate instructions for generating at least one post-object generation layer, each layer comprising at least a slice of the ancillary object to have an intended thermal profile based on the vertical thermal projection. In some examples, as described above, the thermal profile may be similar to (or matched to) the vertical thermal projection in the sense that it may have a similar shape to the vertical thermal projection (i.e. it may cover a similar surface area).

In some examples, the thermal profile may be similar to the vertical thermal projection in the sense that it may have a similar thermal distribution, i.e. be generally hotter where the underlying region of a fabrication chamber in which the layer by layer object generation operation is to be carried out is (or is predicted to be) hotter. This may be achieved through specification of a variable fusing agent contone level over the surface of the ancillary object, and/or through specification of the number of layers of which the ancillary object is formed in any given region.

Figure 5:
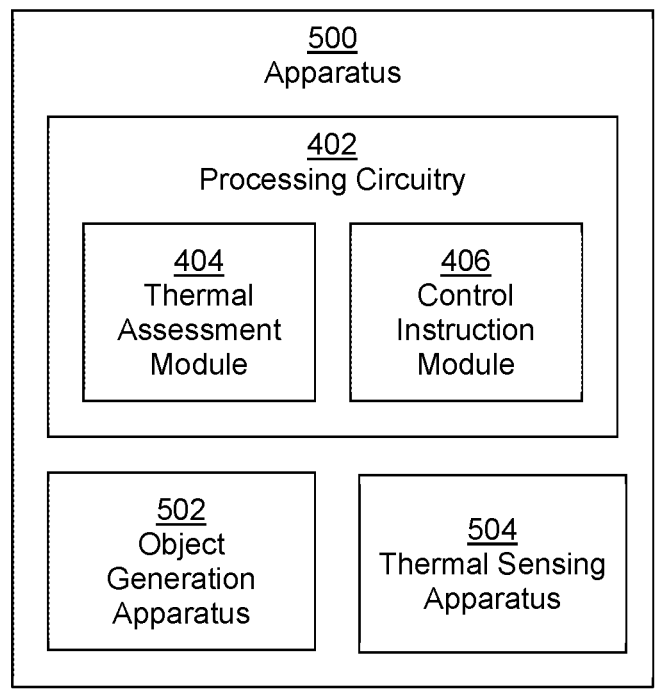
FIG. 5 is another example of apparatus for additive manufacturing.

FIG. 5 is an example of apparatus 500 comprising the processing circuitry 402 described in relation to FIG. 4 above, object generation apparatus 502 and thermal sensing apparatus 504.

The object generation apparatus 502 may generate objects in a layer-wise manner by selectively solidifying portions of layers of build materials. The selective solidification may in some examples be achieved by selectively applying print agents, for example through use of 'inkjet' liquid distribution technologies, and applying energy, for example heat, to each layer. The object generation apparatus 502 may comprise additional components not shown herein, for example a fabrication chamber, a print bed, a print head for distributing print agents, a build material distribution system for providing layers of build material, energy sources such as heat lamps and the like.

The thermal sensing apparatus 504 may for example comprise a thermal imaging camera, a thermal imaging sensor array, or some other thermal sensing apparatus, and may be used to determine heat maps and the like for use in specifying control instructions for the generation of at least one ancillary object.

The processing circuitry 402 may, in some examples, carry out at least one of the blocks of FIG. 2. The object generation apparatus 502 may, in some examples, carry out at least one of the blocks of FIG. 1.

Figure 6:
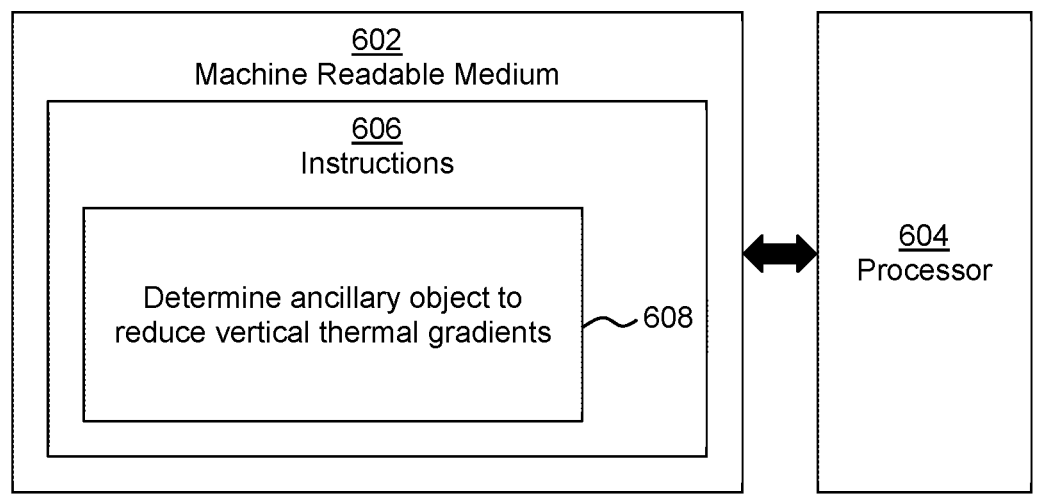
FIG. 6 is an example machine readable medium associated with a processor.

FIG. 6 shows a tangible (non-volatile) machine readable medium 602 associated with a processor 604. The machine readable medium 602 comprises instructions 606 which, when executed by the processor 604, cause the processor 604 to perform processing actions. The instructions 606 comprise instructions 608 to cause the processor 604 to determine, based on a content of a fabrication chamber comprising at least one object (which may be an actual content or an intended content, or the fabrication chamber may be an actual or a virtual fabrication chamber), an ancillary object for generation subsequently to generation of the intended content, wherein the ancillary object is to be formed to reduce vertical thermal gradients during cooling of the content.

In some examples, the instructions 606 may further comprise instructions to form the ancillary object to have a thermal profile based on the thermal profile of an underlying fabrication chamber content, as has been described above. In some examples, the instructions 606 may further comprise instructions to form the ancillary object such that energy absorbed in generating a first portion of the ancillary object is greater than the energy absorbed in generating a second portion of the ancillary object and the first portion of the ancillary object is associated with a hotter region of an underlying fabrication chamber content than the second portion.

In some examples, the machine readable medium 602 comprises instructions 606 to carry out at least one of, or combinations of, the blocks described above in relation to FIG. 1 or FIG. 2, and/or to provide at least one module of the processing circuitry 402.

While examples described herein relate to vertical thermal gradients, it may be the case that at least one ancillary object as described may be formed additionally or alternatively to control thermal gradients in other directions, for example lateral thermal gradients. For example, at least one ancillary object may be formed in portions of a fabrication chamber other than regions near the end of the build job and/or at the top of the fabrication chamber, for example being formed in at least one peripheral side region. In some examples, such peripheral regions may generally be left free of objects as they may be associated with relatively high thermal gradients. Such objects may be formed according the principles set out herein, for example, being specified and/or generated to have a thermal profile based on a thermal diffusion model/thermal projection (which may be a lateral thermal projection) for at least one intended object, which may for example be based on measured and/or modelled temperatures or heat maps. Such objects may vary in contone level and/or thickness in different regions thereof, for example so as to have a thermal profile which is similar to a thermal projection (e.g. a lateral thermal projection) of a fabrication chamber content. A plurality of lateral projections in different directions may be used to define a plurality of objects, for example in each of a plurality of peripheral regions.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the processing circuitry 402, the thermal assessment module 404 and/or the control instruction module 406) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. A method comprising:
in an additive manufacturing process, generating a first object from an initial bottom layer of the first object to a final top layer of the first object, by applying and selectively solidifying build material in correspondence with the first object on a layer-by-layer basis;
after the first object has been additively manufactured, determining a thermal diffusion model by determining a heat map of the final top layer of the first object;
generating a plurality of layers of unfused build material on the final top layer of the first object; and
generating an ancillary object on the layers of the unfused build material from an initial bottom layer of the ancillary object to a final top layer of the ancillary object, by applying the build material and selectively fusing the build material in correspondence with the ancillary object on the layer-by-layer basis, the ancillary object having a thermal profile based on the thermal diffusion model and reducing a thermal gradient of the first object during cooling.

2. The method according to claim 1, wherein the thermal diffusion model is determined by further applying a diffusion function to the heat map.

3. The method according to claim 1, wherein determining the heat map comprises measuring a temperature of the final top layer of the first object.

4. The method according to claim 1, further comprising:
determining instructions for generating the ancillary object, wherein determining the instructions comprises determining instructions for placement of a fusing agent on each of a plurality of layers of the ancillary object.

5. The method according to claim 4, wherein determining the instructions further comprises determining an amount of the fusing agent to place at each of a plurality of locations on each layer of the ancillary object based on the thermal profile that the ancillary object is to have.

6. A non-transitory machine-readable medium comprising instructions which when executed by a processor cause the processor to perform processing comprising:
   in an additive manufacturing process, generating a first object from an initial bottom layer of the first object to a final top layer of the first object, by applying and selectively solidifying build material in correspondence with the first object on a layer-by-layer basis;
   after the first object has been additively manufactured, determining a thermal diffusion model by determining a heat map of the final top layer of the first object;
   generating a plurality of layers of unfused build material on the final top layer of the first object; and
   generating an ancillary object on the layers of the unfused build material from an initial bottom layer of the ancillary object to a final top layer of the ancillary object, by applying the build material and selectively fusing the build material in correspondence with the ancillary object on the layer-by-layer basis, the ancillary object having a thermal profile based on the thermal diffusion model and reducing a thermal gradient of the first object during cooling.

7. The non-transitory machine-readable medium according to claim 6, wherein the thermal diffusion model is determined by further comprises applying a diffusion function to the heat map.

8. The non-transitory machine-readable medium according to claim 6, wherein determining the heat map comprises measuring a temperature of the final top layer of the first object.

9. The non-transitory machine-readable medium according to claim 6, wherein the processing further comprises:
   determining instructions for generating the ancillary object, wherein determining the instructions comprises determining instructions for placement of a fusing agent on each of a plurality of layers of the ancillary object.

10. The non-transitory machine-readable medium according to claim 9, wherein determining the instructions further comprises determining an amount of the fusing agent to place at each of a plurality of locations on each layer of the ancillary object based on the thermal profile that the ancillary object is to have.

11. An apparatus comprising:
    a processor; and
    a memory storing instructions executable by the processor to:
       in an additive manufacturing process, generate a first object from an initial bottom layer of the first object to a final top layer of the first object, by applying and selectively solidifying build material in correspondence with the first object on a layer-by-layer basis;
       after the first object has been additively manufactured, determine a thermal diffusion model by determining a heat map of the final top layer of the first object;
       generate a plurality of layers of unfused build material on the final top layer of the first object; and
       generate an ancillary object on the layers of the unfused build material from an initial bottom layer of the ancillary object to a final top layer of the ancillary object, by applying the build material and selectively fusing the build material in correspondence with the ancillary object on the layer-by-layer basis, the ancillary object having a thermal profile based on the thermal diffusion model and reducing a thermal gradient of the first object during cooling.

12. The apparatus of claim 11, wherein the thermal diffusion model is further determined by further applying a diffusion function to the heat map.

* * * * *